United States Patent
Qi (10) Patent No.: US 10,636,114 B2
(45) Date of Patent: Apr. 28, 2020

(54) SYSTEM AND METHOD FOR SCAN-MATCHING ORIENTED VISUAL SLAM

(71) Applicants: Beijing Jingdong Shangke Information Technology Co., Ltd., Beijing (CN); JD.com American Technologies Corporation, Mountain View, CA (US)

(72) Inventor: Chengzhi Qi, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 97 days.

(21) Appl. No.: 16/055,082

(22) Filed: Aug. 4, 2018

(65) Prior Publication Data

US 2020/0043130 A1 Feb. 6, 2020

(51) Int. Cl.
 *G06T 3/00* (2006.01)
 *G06T 7/44* (2017.01)
 *G06T 7/00* (2017.01)

(52) U.S. Cl.
 CPC .......... *G06T 3/0031* (2013.01); *G06T 7/0002* (2013.01); *G06T 7/44* (2017.01); *G06T 2207/10024* (2013.01); *G06T 2207/10028* (2013.01)

(58) Field of Classification Search
 CPC ................................ G06T 7/44; G06T 7/0002
 See application file for complete search history.

(56) References Cited

U.S. PATENT DOCUMENTS

| 2013/0089259 A1* | 4/2013 | Cha | G06K 9/00664 382/173 |
|---|---|---|---|
| 2017/0214899 A1* | 7/2017 | Meier | G06T 19/006 |

* cited by examiner

*Primary Examiner* — Edward Park
(74) *Attorney, Agent, or Firm* — China Science Patent & Trademark US LLC; Shanyun Lu (57) ABSTRACT

A system and method for constructing and updating a two dimensional (2D) grid cell map based on depth images and RGB images. The method includes: providing an RGB image and a depth image by a sensor of a computing device; determining scores of pixels in the RGB image representing possibility of the pixels being located in a ground plane; determining normal directions of pixels in the depth image; determining the ground plane based on the scores and the normal directions; projecting the pixels in the depth images to the ground plane; and generating and updating the 2D grid cell map by defining the ground plane into grid cells and attributing a color descriptor to each grid cell. The color descriptor of each grid cell is calculated based on the projected pixels within that grid cell.

20 Claims, 4 Drawing Sheets

SYSTEM AND METHOD FOR SCAN-MATCHING ORIENTED VISUAL SLAM

FIELD OF THE DISCLOSURE

The present disclosure relates generally to the field of image processing, and more particularly to systems and methods for feature-based two-dimensional (2D) scan matching simultaneous localization and mapping (SLAM).

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In robotics research, simultaneous localization and mapping (SLAM) is widely applied in ground robots and unmanned vehicle using visual data. However, visual SLAM is easy to get lost in non-feature environment, for example, white wall.

Therefore, an unaddressed need exists in the art to address the aforementioned deficiencies and inadequacies.

SUMMARY OF THE DISCLOSURE

In certain aspects, the present disclosure relates to a method for constructing and updating a 2D grid cell map or pixel map using red-green blue (RGB) images and depth images, so as to achieve SLAM efficiently and accurately based on the 2D grid cell map. In certain embodiments, the method includes: providing an RGB image and a depth image of a three-dimensional (3D) space by a sensor of a computing device, the sensor having extrinsic parameters; determining scores of pixels in the RGB image, wherein the scores representing possibility of the pixels in the RGB image being located in a ground plane; determining normal directions of pixels in the depth image; determining the ground plane based on the scores and the normal directions; projecting the pixels in the depth images to the ground plane to form projected pixels; when the 2D grid cell map is not available, generating the 2D grid cell map by defining the ground plane into grid cells and attributing a color descriptor to each grid cell, wherein the color descriptor of each grid cell is calculated based on the projected pixels within that grid cell; and when the 2D grid cell map is available, updating the 2D grid cell map by attributing a new color descriptor to each grid cell and updating that grid cell based on the new color descriptor In certain embodiments, the sensor is an RGB-depth (RGBD) sensor and the computing device is a robotic device.

In certain embodiments, the scores of the pixels in the RGB image are determined using deep learning.

In certain embodiments, the normal directions of the pixels in the depth image are determined using nearest neighbor normal direction.

In certain embodiments, the step of determining the ground plane includes: defining a candidate ground plane based on the extrinsic parameters, and refining the candidate ground plane based on the normal directions of the pixels in the depth images to obtain the ground plane.

In certain embodiments, the step of determining the ground plane includes: defining a candidate ground plane based on the extrinsic parameters, and refining the candidate ground plane based on the normal directions of the pixels in the depth images and the scores of the pixels in the RGB image to obtain the ground plane.

In certain embodiments, each of the pixels in the depth image is projected to the ground plane along a straight line passing through the pixel and perpendicular to the ground plane.

In certain embodiments, the method further comprises a step of matching the grid cells and the 2D grid cell map by: comparing distance, roll angle and color descriptor of each grid cell to the grid cells in the 2D map.

In certain embodiments, the method further includes detecting loop closure based on the match between the grid cells based on the current image and the 2D map.

In certain embodiments, the ground plane comprise a true ground plane in the 3D space and a plane parallel to the true ground plane and located within a pre-determined distance to the true ground plane. In certain embodiments, the pre-determined distance is less than 100 centimeters (cm), preferably less than 10 cm, more preferably less than 1 cm, and more preferably less than 10 millimeter (mm).

In certain embodiments, the color descriptor is in a form of color histogram, color gradient, or binary descriptor.

In certain embodiments, the method further includes: initializing the 2D map using a plurality of RGB images and corresponding depth images.

In certain aspects, the present disclosure relates to a method. In certain embodiments, the method includes: providing an RGB image and a depth image of a 3D space by a sensor; determining normal directions of pixels in the depth image; determine a candidate ground plane based on extrinsic parameters of the sensor; refining the candidate ground plane using the normal directions; projecting the pixels in the depth image to the ground plane; and generating a 2D grid cell map by defining the ground plane into grid cells and attributing a color descriptor to each grid cell. The color descriptor of each grid cell is calculated based on the projected pixels within that grid cell.

In certain embodiments, the method further includes, when the 2D grid cell map is available: updating the 2D grid cell map by attributing a new color descriptor to each grid cell and updating the corresponding grid cell in the 2D grid cell map based on the new color descriptor. The new color descriptor of each grid cell is calculated based on the projected pixels within that grid cell.

In certain embodiments, the method further includes, after determining the candidate ground plane and before refining the candidate ground plane: refining the candidate ground plane using scores of pixels in the RGB image, wherein the scores representing possibility of the pixels in the RGB image being located in a ground plane.

In certain aspects, the present disclosure includes a system for constructing and updating a 2D grid cell or pixel map. In certain embodiments, the system includes a computing device (or a robotic device). The computing device includes a sensor, a processor and a storage device storing computer executable code, the computer executable code, when executed at the processor, is configured to perform the methods described above.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION OF THE DISCLOSURE

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure may be implemented by computer systems. As depicted in the drawings, computer components may include physical hardware components and virtual software components. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In certain embodiments, 2D SLAM are applied on ground robots and unmanned vehicle. These 2D SLAM methods can not only reduce the computational load for the robot pose with a good initialization, but also build human-friendly map. However, the 2D SLAM methods don't maintain feature detection or feature description, and have the disadvantages of getting lost in non-feature environment, being trapped in local maximum, unsuitable for instant pose recovery, difficult loop closure, and difficult pose recovery. The related techniques include dense scan 2D SLAM, Iterative Closest Points (ICP), Gmapping, Cartographer, which are incorporated herein by reference in their entirety.

In certain aspects, to overcome the limitation of the instant pose recovery in 2D scan-matching SLAM method, a scan matching oriented visual SLAM is provided. The scan matching oriented visual SLAM provides a reliable way for combining 2D scan with color histogram/feature for mapping using RBGD camera. Further, the robot was able to recover its pose with instant measurement and given map. This novel SLAM method can help the robot with better loop closure trigger as well as easier operating for initialization. The novel features according to certain embodiments of the present disclosure, among other things, include: (1) obtain ground plane information from RGB image, depth image, and extrinsic calibration; (2) generate depth scan measurement from depth image by projecting depth image to the ground plane; (3) combine color abstract feature to scan points; (4) Compute scan matching and define matching error by color feature matching to improve matching accuracy, so that the matching method no longer relied on good initialized pose. The advantages according to certain embodiments of the present disclosure, comparing with other 2D SLAM, include but are not limited to: (1) more robust and accurate for localization; And (2) able to compute data association and perform loop closure for mapping. The advantages according to certain embodiments of the present disclosure, comparing with visual SLAM, include but are not limited to: (1) feature detection were more stable; (2) less false positive for data association; and (3) less computation load for feature matching.

In certain embodiments, the present disclosure includes (1) ground plane detection and point cloud projection, (2) color description computing, (3) scan matching, (4) map building, and (5) localization and color feature verification.

(1) At first, ground plane detection and point cloud projection are performed. In certain embodiments, the ground plane detection is generated by detecting the major ground plane direction, and then verifying with the sensor extrinsic parameter. In certain embodiments, a deep learning based method is applied for ground plane detection. Based on extrinsic parameter and ground plane extraction, the ground plane was subtracted from a color image and a depth image. A 2D gridded cell map is built on the ground plane to compute the occupation space. In certain embodiments, the depth image is projected into 3D space, and the pixels of RBG image were associated together for all the points that projected in the same occupied cell on the ground plane. Specifically, we first project the 2D depth image into the 3D space and form a 3D point-cloud, and then project to the ground plane. The 2D ground plane is also referred to as the 2D gridded cell. This step generates a scan detection for later scan matching.

(2) Then color descriptor is computed. Color image and depth image are associated together pixel to pixel. Color descriptors are generated for each occupied cell according to the projected depth pixels and their nearby color image. In certain embodiments, the descriptors includes any one or any combination of color histogram, color gradient, and binary descriptor, and represent as a label of the feature of the occupied cell in the scan. In general, the point further from the ground provides a better description for the cell, which affected less from the arbitrary items on the ground.

(3) After that, scan matching can be performed. In certain embodiments, scan matching uses a general method to compare scan similarity, for example ICP or/and particle filter. The color description is used as an add-on verification for the comparison of the scan matching. The feature matching error contributes to the scan match covariance. By this type of design, 2D SLAM drift is reduced, especially in repeat geometry environment with variable decoration with very low cost sensor.

(4) After that, a map is built by merging the scan matching together and storing the color descriptors into the map. In certain embodiments, a bag of word structure is used to group the features together, so that they are easy to search. This map is saved for later localization usage.

(5) Finally, localization and color feature verification can be performed in real time. After the map is built, the robot is able to initialize from any know location. The robot uses RGBD sensor to scan current location, compute and map the color description and depth map to 2D occupation map. By searching the feature measure from the bag of word, and then make ICP, robot acquires fast a reliable initial pose for later navigation.

By adding color information into 2D scan matching method, certain embodiments of the present disclosure improves the reliability in navigation, pose recovery, and localization. In summary, this innovation is a scan-matching oriented visual SLAM method. The innovation included but not limit to: ground plane detection; scan projection; color descriptor generation and mapping on the project scan; scan matching; and mapping and localization.

The present disclosure will now be described more fully hereinafter with reference to the accompanying drawings, in which embodiments of the present disclosure are shown.

This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 1:
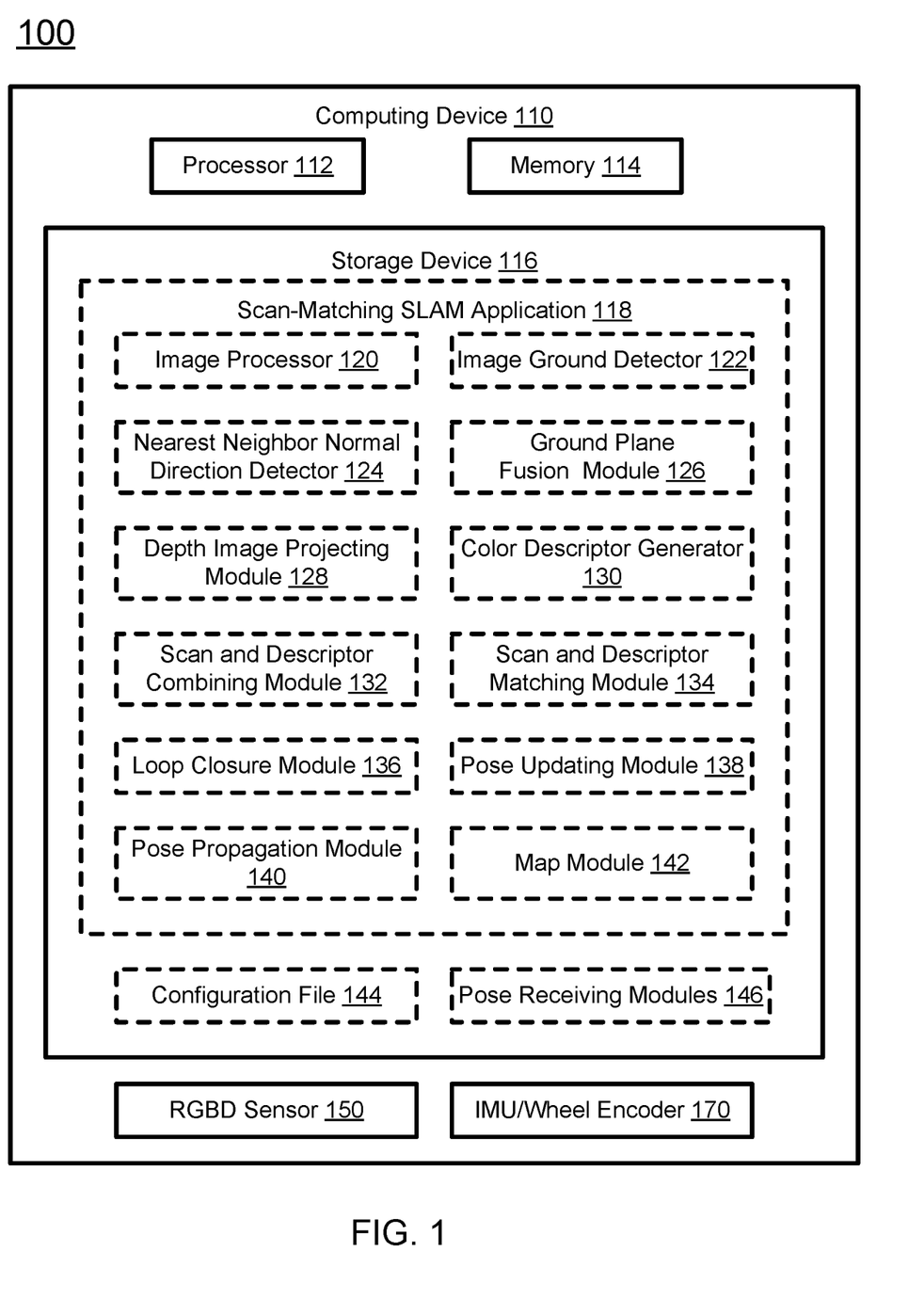
FIG. 1 schematically depicts a system for scan-matching oriented visual SLAM according to certain embodiments of the present disclosure.

In certain aspect of the present disclosure, a system for feature-based scan matching SLAM is provided. In certain embodiments, as shown in FIG. 1, a feature-based scan matching SLAM system 100 doesn't rely on fiducial markers in the environment for SLAM, and includes a computing device 110. The computing device 110 may be a ground robotic device with an RGBD sensor, an augmented reality/virtual reality (AR/VR) device, a 3D reconstruction device, or an unmanned aerial vehicle (UAV) etc. In certain embodiments as described below, the computing device 110 and the robotic device 110 may be used interchangeably. The computing device 110 includes a processor 112, a memory 114, a storage device 116 storing computer executable code, an RGBD sensor 150 and optionally an IMU/Wheel encoder 170. The RGBD sensor 150 is configured to capture RGB images, depth images, or the combined RGB-depth images. The IMU/Wheel encoder 170 may include one or more IMUs, or one or more wheel encoders, or both the IMUs and the wheel encoders. The IMUs are inertial sensors, such as accelerometers, gyroscopes and magnetometers, which are configured to perform inertial measurement of the computing device 110; the wheel encoder is configured to measure distance traveled by the computing device 110. In certain embodiments, the computing device 110 may not include the IMU/Wheel encoder 170. In certain embodiments, the computing device 110 may include other necessary components. Exemplary other components may include an interactive interface for communicating with other devices, such as a wireless connection with a central computer.

As shown in FIG. 1, the computer executable code includes a scan-matching SLAM application 118, a configuration file 144, and one or more pose receiving modules 146, and optionally other applications such as an operating system. The processor 112 controls operation of the computing device 110. In certain embodiments, the processor 112 may be a central processing unit (CPU). The memory 114 may be a volatile memory, such as the random-access memory (RAM), for storing the data and information during the operation of the computing device 110. In certain embodiments, the memory 114 may be a volatile memory array. In certain embodiments, the computing device 110 may run on more than one processor 112 and/or more than one memory 114. The storage device 116 is a non-volatile data storage media or device for storing the scan-matching SLAM application 118 of the computing device 110. Examples of the storage device 116 may include flash memory, memory cards, USB drives, or other types of non-volatile storage devices such as hard drives, floppy disks, optical drives, or any other types of data storage devices. In certain embodiments, the computing device 110 may have more than one storage device 116. In certain embodiments, the computing device 110 may also include a remote storage device. The scan-matching SLAM application 118 include the code or instructions which, when executed at the processor 112, may perform certain features to control the operation of the computing device 110. In certain embodiments, the scan-matching SLAM application 118 is configured to perform simultaneous localization and mapping (SLAM) of the computing device 110 based on both depth scan and color image feature. The configuration file 144 includes calibrated extrinsic and optionally intrinsic parameters of the RGBD sensor 150. The extrinsic parameters stored in the configuration file 144 may have the format of (x, y, z, roll, yaw, pitch), which define the relative mounting location of the RGBD sensor 150 on the computing device 110. The pose receiving modules 146 are configured to, upon receiving current pose of the computing device 110 from the scan-matching SLAM application 118, control the operation of the computing device 110 based on its current pose in real time.

In certain embodiments, as shown in FIG. 1, the scan-matching SLAM application 118 includes, among other things, an image processor 120, an image ground detector 122, a nearest neighbor normal direction detector 124, a ground plane fusion module 126, a depth image projecting module 128, a color descriptor generator 130, a scan and descriptor combining module 132, a scan and descriptor matching module 134, a loop closure module 136, a pose updating module 138, a pose propagation module 140, and a map module 142.

The image processor 120 is configured to receive RGBD images from the RGBD sensor 150. In certain embodiments, the image processor 120 may also instruct the RGBD sensor 150 to capture RGBD images before receiving the RGBD images. The received RGBD images may be separated RGB images and depth images, or combined RGB images and depth images. In certain embodiments, the combined RGBD images include four channels: an R channel for storing red color component, a G channel for storing green color component, a B channel for storing blue color component, and a depth channel for storing distance. After receiving an RGBD image having the four channels, the image processor 120 is configured to split the channels to form an RGB image (three channels) and a depth image (one channel), then send the RGB image to the image ground detector 122 and send the depth image to the nearest neighbor normal direction detector 124. In certain embodiments, the image processor 120 is configured to send the RGB image and the depth image frame by frame. In other embodiments, for example to initialize the 2D map, the image processor 120 may also send a batch of frames.

The image ground detector 122 is configured to detect ground using a current RGB image received from the image processor 120. In certain embodiments, the image ground detector 122 is configured to detect the ground from the RGB image using deep learning or deep neural network (DNN), and the deep learning generates a score for each pixel in the RGB image. Each score represents the likelihood of that pixel being included in the ground plane. In certain embodiments, the image ground detector 122 may not use deep learning for ground detection, instead, it may determine the scores based on the coordinates and the descriptor of each pixel. For example, the image ground detector 122 may calculate a descriptor for each pixel, compare the descriptor of the pixel with the descriptors of the neighboring pixels, and determine that the pixels are located in the same plane when their descriptors are similar. The image ground detector 122 then gives a great score for the pixels within a large plane, and gives a great score for the pixels located at a lower portion of the RGB image. In certain embodiments, the deep learning method is preferred. After assigning a score for each pixel using deep learning or non-deep learning, the image ground detector 122 is configured to send the scores to the ground plane fusion module 126.

The nearest neighbor normal direction detector 124 is configured to, upon receiving the depth image from the image processor 120, determine the normal direction of each pixel in the current depth image, and send the normal direction and depth of each pixel to the ground plane fusion module 126. In certain embodiments, a nearest neighbor normal direction method is used to determine the normal direction of a pixel. Specifically, the nearest neighbor normal direction detector 124 is configured to select a pixel in the depth image and choose eight pixels surrounding or immediately next to the selected pixel (when available) to be processed together. The normal directions of the nine pixels are averaged to obtain the normal direction of the selected pixel. The average may be a simple mathematical average or a weighted average. In certain embodiments, when the average is a weighted average, the selected pixel is given more weight than its eight neighboring pixels. The nearest neighbor normal direction detector 124 is further configured to send the normal direction of the pixels and the depth of the pixels (the distance from the sensor or camera to the 3D location of that pixel) to the ground plane fusion module 126. In certain embodiments, the image ground detector 122 is performed in one thread, the nearest neighbor normal direction detector 124 is performed in another thread, and the two threads are jointed at the ground plane fusion step performed by the ground plane fusing module 126.

Figure 2:
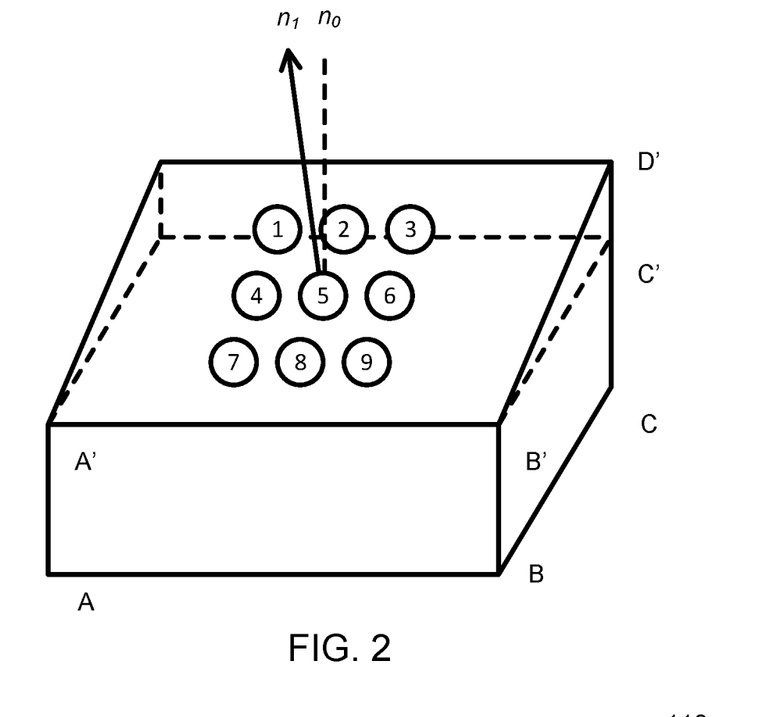
FIG. 2 schematically depicts a normal direction of a pixel in a depth image according to certain embodiments of the present disclosure.

FIG. 2 schematically shows the determination of a normal direction of a target pixel in the depth pixel image. As shown in FIG. 2, the ground plane is shown as ABC (the plane passing the points A, B and C), the plane A'B'C' is parallel to and above the ground plane, and the normal direction to the ground plane is no. The target pixel "5" in the depth image is surrounded by eight nearest neighboring pixels "1-4" and "6-9." The nearest neighbor normal direction detector 124 calculates a plane A'B'D' determined by the pixels 1-9, and the normal direction $n_1$ of the target pixel "5" is defined as passing through the pixel "5" and perpendicular to the plane A'B'D'. In certain embodiments, the nine pixels have the same weight for determining the plane A'B'D'. In other embodiments, the nearest neighbor normal direction detector 124 gives the pixel "5" more weight and makes the plane A'B'D' exactly passing through the pixel "5."

The ground plane fusion module 126 is configured to, upon receiving the scores of the RGB image pixels from the image ground detector 122, the normal directions of the depth image pixels from the nearest neighbor normal direction detector 124, and the extrinsic parameters of the RGBD sensor 150 from the configuration file 144, fuse the information to determine the ground plane. In certain embodiments, the normal directions of the pixels in the depth image are obtained, and for the pixels at the same plane, their normal directions are the same or close to each other. Accordingly, the ground plane fusion module 126 can determine one or more planes from the normal directions received from the nearest neighbor normal direction detector 124, each plane has a large number of pixels that close to each other and have the same or similar normal directions. In certain embodiments, one of the planes containing the largest number of pixels than the other planes, and locates at a lower portion of the depth image may be determined as the candidate ground plane. Further, the extrinsic parameters stored in the configuration file 144 define the relative location of the RGBD sensor 150 on the computing device 110. The extrinsic parameters may have the format of (x, y, z, roll, yaw, pitch), which indicate the relative position of the RGBD sensor 150 to the robotic device 110. Accordingly, the ground plane fusion module 126 can determine the bottom surface of the computing device 110 based on the extrinsic parameters obtained from the configuration file 144. During operation, the bottom surface of the computing device 110 normally is close to the ground plane. Based on the closeness between the ground plane and the bottom surface of the robotic device 110, the ground plane fusion module 126 compares the one or more planes based on the normal directions with the bottom surface of the computing device 110 based on the extrinsic parameters. When one of the one or more planes based on the depth image is close to the bottom surface of the computing device 110, the ground plane fusion module 126 determines that the plane is the real ground plane or is close to the real ground plane, and is named ground plane in the depth image. At the same time, the ground plane fusion module 126 processes the pixels from the RGB image which have scores for all the pixels. The scores represents the possibility that the pixels belong to the ground plane. The ground plane fusion module 126 is configured to check the scores of the pixels, and group high score and substantially continuous pixels to form one or more planes. The one or more planes may include floor, wall, door, etc. Based on the ground plane determined based on the depth image, the ground plane fusion module 126 selects one of the one or more planes from the RGB image as the ground plane in the RGB image. Thus, the ground plane in the RGB image corresponds to the ground plane in the depth image. Further, because the pixels in the RGB image correspond to the pixels in the depth image, the ground plane fusion module 126 may also use the correspondence to assist the ground plane fusion. Specifically, the pixels in the ground plane determined based on the depth image is further filtered based on the high resolution RGB pixels, so as to remove noise from the ground plane determined using the depth image. The determined ground plane is the floor or ground of the scene, or a small distance above the ground, for example, 10 mm above the ground. In certain embodiments, the ground plane fusion module 126 represents the ground plane using a ground plane model $ax+by+cz+d=0$, where x, y, z are coordinates of the initial 3D space of the computing device 110, and a, b, c and d are coefficient. The ground plane fusion module 126 then sends the determined ground plane and the depth image to the depth image projecting module 128. In certain embodiments, the process of ground plane determination is as follows: firstly, based on camera extrinsic parameter, the process obtains which 3D point may belong to the ground (the points have the height similar to 0). Secondly, the process groups the points on the ground with similar normals together and compare the normal with the ground's normal (the ground's normal is also from camera extrinsic). Thirdly, the process extracts the ground points and fit a ground plane with the above ground plane model and set it as the ground. In certain embodiments, the ground planes are roughly estimated based on extrinsic parameters of the RGBD sensor 150. In certain embodiments, the ground planes are estimated based on the extrinsic parameters of the RGBD sensor 150 and then refined using normal directions of the pixels from the depth image. In certain embodiments, the ground planes are determined based on extrinsic parameters of the RGBD sensor 150, refined using normal directions of the pixels from the depth image, and further refined using the scores of the pixels from the RGB image. In certain embodiments, the ground plane fusion module 126 further defines a 2D grid cell map on the ground plane by dividing the ground plane into grid cells.

The depth image projecting module 128 is configured to, upon receiving the ground plane representation and the depth image, projecting the depth image pixels to the ground plane. As described above, the ground plane may be in a form of a 2D grid cell map. In certain embodiments, the 2D grid cell map is built at the ground plane or a small distance to the ground plane. The depth image projecting module 128 can draw a straight line from each of the depth pixels toward the ground plane and perpendicular to the ground plane to determine the projected pixel. Thus, there is only one point in the ground plane corresponding to each of the depth pixels, no matter what the pose of the computing device 110 (or a robotic device) is. Even if the computing device 110 is tilt during operation, the projected pixel for a depth pixel will not change location on the ground plane; but for a tilted portion of the ground planes, the corresponding pixels are perpendicular to that tilted portion, not to a sea level plane.

Figure 3:
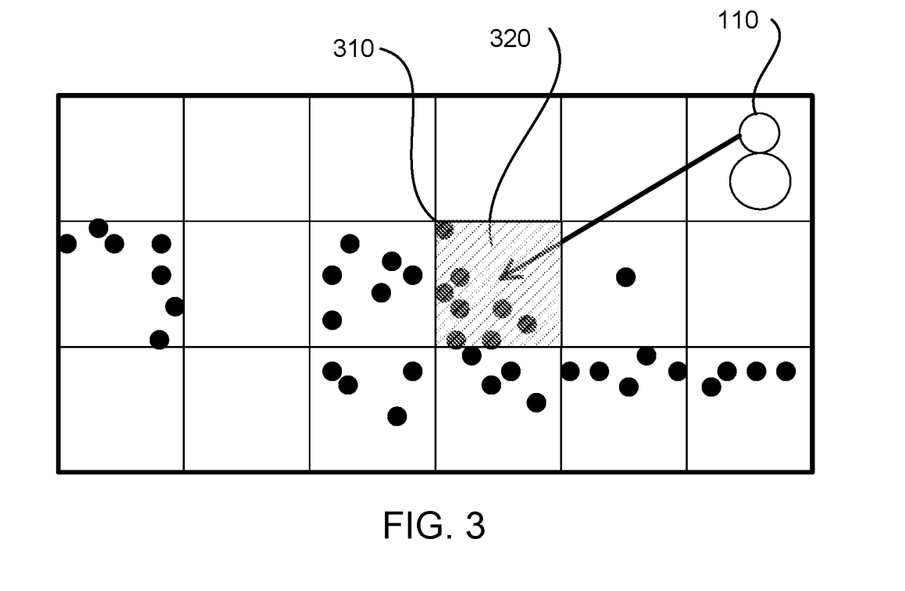
FIG. 3 schematically depicts a grid cell map according to certain embodiments of the present disclosure.

Based on those information, the depth image projecting module 128 is configured to project each of the depth pixels in the depth image to the ground plane, along a direction perpendicular to the ground plane. As shown in FIG. 3, all the pixels located on the ground plane and projected pixels 310 on the ground plane within a specific grid cell 320 are represented by (distance, roll angle) of that unit cell 320. Here the distance is between the robotic device 110 and the unit cell 320 (the center of the unit cell or one specific corner of the unit cell), and the roll angle is the direction of the robotic device 110 toward the unit cell (relative to for example the origin). For each grid cell unit of the ground plane, the depth image projecting module 128 projects those depth pixels exactly above the grid cell and perpendicular to the grid cell plane into the grid cell. In certain embodiments, the ground plane may include different ground plane portions, and for each portion of the ground plane (which may not be leveled with other portions of the ground plane), the pixels along the ground plane portion's normal directions are projected to the ground plane portion. In other words, even if the computing device 110 is tilt during operation, each grid cell always keeps only the depth pixel information exactly above the grid cell along the grid cell's normal direction. Although multiple pixels are shown in FIG. 3, there is not required to store the exact number or locations of the pixels in each of the cells. The number and distribution of the pixels for each grid cell may be represented by one parameter only, a color descriptor. After construction, the depth image projecting module 128 sends the 2D grid cells with the robot pose to the scan and descriptor combining module 132.

The color descriptor generator 130 is configured to, upon receiving the RGB image from the RGBD sensor 150 and the pixels and projected pixels in the grid cells from the depth image projecting module 128, generate color descriptors of the grid cells and send the color descriptors to the scan and descriptor combining module 132, so that the scan and descriptor combining module 132 associate the descriptor with the grid cells observed at the current frame. Specifically, each grid cell corresponds to multiple pixels located on the ground plane and pixels projected to the ground plane at the location of the grid cell, those pixels have corresponding RGB information in the RGB image, and the color descriptor 130 generates one color descriptor corresponding to those pixels. In one example, the color descriptors may be in a form of color histogram.

The scan and descriptor combining module 132 is configured to, after receiving the scan result from the depth image projecting module 128 and the color descriptor from the color descriptor generator 130, combine the information to form scan and descriptor of the ground plane of the current image. As a result, the ground plane now includes the grid cells and a color descriptor corresponding to each of the grid cells, in a form of (distance, roll angle, color descriptor), where the distance and roll angle represent the relationship between the grid cell and the robotic device 110, and the color descriptor represents the color information of all the color pixels corresponding to the grid cell. For convenience of description, those 2D grid cells, each with a corresponding color descriptor, are named projected color grid cells or hybrid grid cells.

The scan and descriptor matching module 134 is configured to, upon receiving the 2D grid cell map from the map module 142 and the hybrid grid cells, match the hybrid grid cells to the 2D grid cell map. In the 2D grid cell map, each grid cell has three states, occupied, empty or unknown, and each occupied grid cell has a color descriptor component, and is characterized as (distance, roll angle, color descriptor). The scan and descriptor matching module 134 then search each of the hybrid grid cells against the 2D grid cell map to locate a corresponding match grid cell. In certain embodiments, the search is performed by searching the distance and roll angle parameter, and then confirm with the color descriptor. Because the match is on a 2D map, the process is fast. Further, because each of the hybrid grid cells and the occupied grid cells in the 2D grid cell map have not only the distance and roll angle, but also the color descriptor, the searching and matching is accurate. In certain embodiments, the match is performed using all the hybrid grid cells in the current frame, and the match between all the hybrid grid cells and the corresponding grid cells in the 2D grid cell map is evaluated, and a match is found when the overall match of all the hybrid grid cells is good. In certain embodiments, the scan and descriptor matching module 134 may also match the grid cells in the current frame or image to the immediate previous frame(s) or immediate previous key frame(s), and associate those grid cells in the current frame to the map through the correspondence between the grid cells in the key frame(s) and the 2D grid cell map. After the matching, the scan and descriptor matching module 134 records the matched hybrid grid cells and send the match to the loop closure module 136 and the pose updating module 138.

The loop closure module 136 is configured to, upon receiving the 2D grid cell map from the map module 142 and the matched scan from the scan and descriptor matching module 134, use the matched information and the 2D grid cell map to detect loop closure, that is, detect previously visited location in the environment. In certain embodiments, the loop closure detection is performed by matching the newly obtained grid cells with the grid cells in the grid cell map. Because the color descriptor is included for each hybrid grid cell, accurate and fast match between new grid cells and the 2D grid cell map are possible, and as a result, loop closure is performed efficiently. At this time, the matched information has not been incorporated to the 2D grid cell map yet, and the matched information and the detected loop closure will be used to update robot pose and then update the map. After loop closure detection, the loop closure module 136 is further configured to send the detected loop closure information to the pose update module 138 for updating the pose of the robotic device 110.

In certain embodiments, the image ground detector 122 performs its function in one thread using current RGB image, the nearest neighbor normal direction detector 124 performs its function in another thread using the current depth image, and the loop closure module 136 performs its function in a further thread using the received scan and descriptor match and the map, and sends the loop closure information to update the robot pose.

The pose updating module 138 is configured to, upon receiving the matched hybrid grid cells from the scan and descriptor matching module 134, and when available, loop closure information from the loop closure module 136, and optionally extrinsic parameters from the configuration file 144, calculate the relative rotation and translation between the current pose and last robot pose measurement, and update the pose of the robotic device 110. The pose updating module 138 presents the robot pose as (x, y, yaw) in global frame at current time, where x, y is the coordinates of the robotic device 110 in the map, and yaw is the direction of the robotic device 110 in the map relative to the origin. In certain embodiments, the relative pose change based on IMU/wheel encoder 170 is also considered to update the robot pose, which may be highly weighted due to its accuracy. The pose updating module 138 is further configured to send the robot pose to the pose propagation module 140, the map module 142, and the pose receiving modules 146.

The pose propagation module 140 is configured to, upon receiving the robot pose (x, y, yaw) in global frame at current time from the pose updating module 138, propagate the robot pose in the current frame to the next frame. In certain embodiments, the pose propagation module 140 is configured to propagate the robot pose to the depth image projecting module 128 for its calculation in the next frame.

The map module 142 is configured to, upon receiving the robot pose (x, y, yaw) in global frame at current time from the pose updating module 138, and possible loop closure information from the loop closure module 136, use the new scan grid cells to update the grid cell map. The updated map contains grid cells in 2D, each grid cell has one of three states, occupied, empty, and unknown. Each occupied grid cell is represented with coordinates (x, y) in the grid cell map and the characterization of (distance, roll angle, color descriptor). The map module 142 is further configured to send the updated grid cell map to the loop closure module 136 for detecting loop closure when the loop closure module 136 receives the next batch of matched scan and descriptor, and send the updated grid cell map to the scan and descriptor matching module 134 so that the scan and descriptor matching module 134 matches the new scan grid cells to the grid cells in the grid cell map. In the above embodiments, the map is a grid cell map, and the descriptor of each grid cell corresponds to all the pixels projected into that cell. In other embodiments, the map may be a pixel map comprising scan pixels with color descriptors. When the unit of the map is a grid cell instead of a pixel, the whole process is more efficient.

In certain embodiments, when the scan-matching SLAM application 118 is initialized, and there is no map available yet, the map module 142 is configured to construct a 2D map based on the first few captured images or frames. Basically, the RGBD sensor 150 captures a plurality of images (at least two). For each image or frame, the image processor 120 separates the images into RGB images and depth images, the image ground detector 122 detect scores for pixels in the RGB image being on the ground, the nearest neighbor normal direction detector 124 detect normal directions for each pixel in the depth image, the ground plane fusion module 126 combines extrinsic parameters, the scores and normal directions of the pixels to determine the pixels belong to the ground plane, the depth image projecting module 128 divide the ground plane into grid cells and projects the scan pixels to the grid cells on the ground plane, the color descriptor generator 130 generates color descriptors for the pixels in the RGB image corresponding to each of the grid cell, the scan and descriptor combining module 132 associates the calculated descriptor to the corresponding grid cell. After analyzing all of the first several images, the map module 142 matches the grid cells in those images, and construct a grid cell map using the grid cells. For each grid cell, the projected pixels in the grid cell are combined together, and one color descriptor is sufficient. In other embodiments, other type of occupation map or even a pixel map can be used. In certain embodiments, the pose of the robotic device 110 can also be added to the 2D map.

The configuration file 144 stores the calibrated extrinsic parameter of the RGBD sensor 150. The parameters define the orientation and location (relative pose) of the RGBD sensor 150 to the robotic device 110. In certain embodiments, the scan-matching SLAM application 118 is further configured to calibrate the pose of the RGBD sensor 150 based on the pixel map or grid cell map, and update the configuration file 144 with the calibrated parameters. In certain embodiment, the configuration file 144 may also stores intrinsic parameters of the RGBD sensor 150, which may include optical center, lens distortion, and focal length.

The pose receiving modules 146 is configured to, upon receiving the robot pose (x, y, yaw) in global frame at current time from the pose updating module 138, perform its function based on the current robot pose, for example, control the operations of the robotic device 110 based on the current robot pose.

FIG. 3 schematically shows part of a grid cell map according to certain embodiments of the present disclosure. As shown in FIG. 3, the grid cell map is a 2D map having (x, y) coordinates. The (x, y) in the grid cell map shown in FIG. 3 has a unit of a predetermined distance, such as 1 cm or 1 millimeter (mm), and each of $x_i$ or $y_i$ of a grid cell may be a real number of an integer. Each grid cell of the grid cell map includes information of all the pixels on the ground plane and within the grid cell, and the pixels above the ground plane, and which when being projected to the ground plane, are also located within the grid cell. The RGB information of those pixels corresponding to each grid cell is combined and calculated to provide one color descriptor for that grid cell.

The grid cell map shown in FIG. 3 is a 2D map, and thus the searching and matching of grid cells to the 2D map are much faster than searching and matching grid cells to a 3D map. On the other hand, color descriptors are included in the 2D map, and the searching and matching are more accurate when considering both the 2D scan and the color descriptor.

Figure 4:
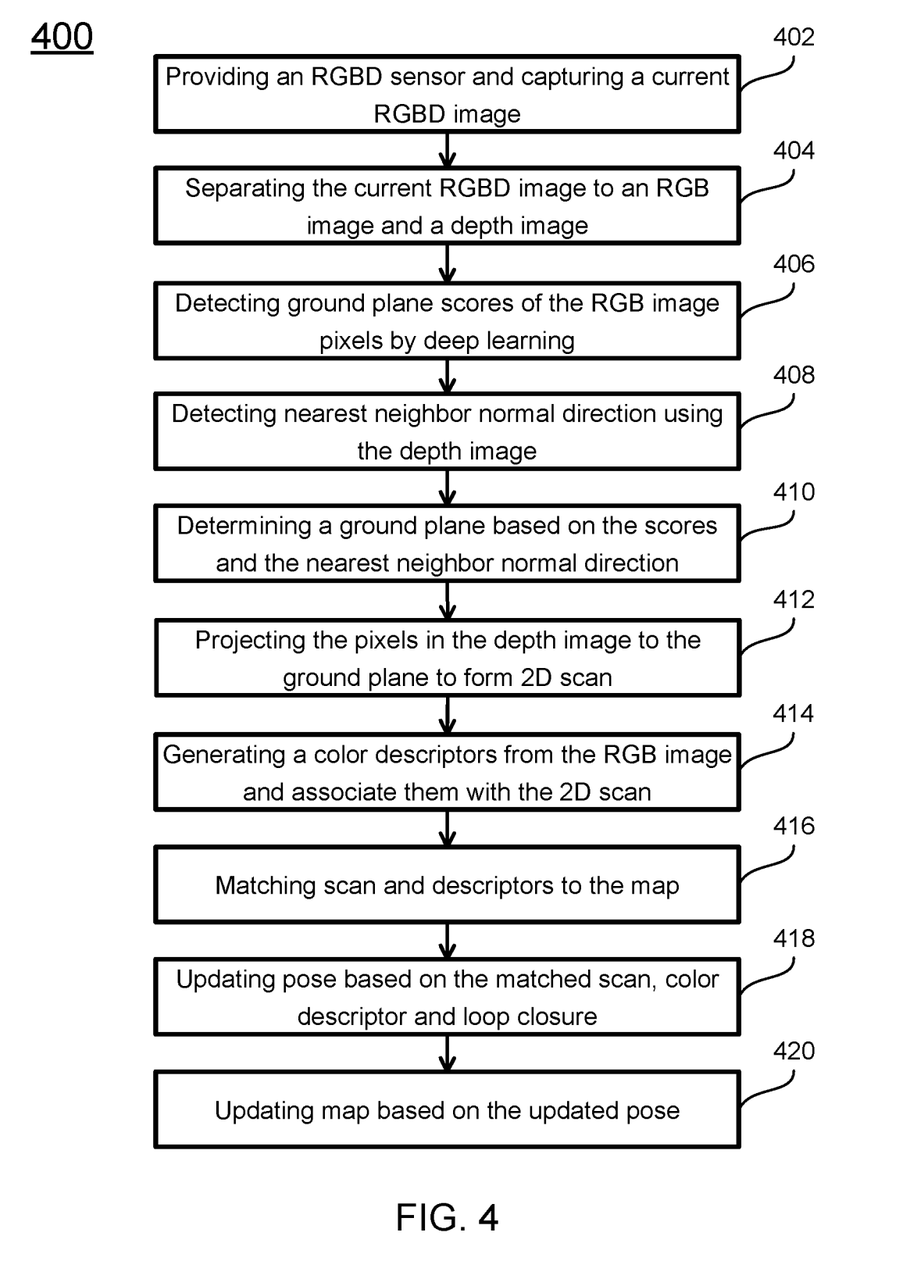
FIG. 4 schematically depicts a method of scan-matching oriented visual SLAM according to certain embodiments of the present disclosure.

In certain aspects, the present disclosure relates to a method of scan matching oriented visual SLAM, which combines 2D scan with color histogram/feature for mapping using RGBD camera. FIG. 4 schematically depicts a method of scan-matching oriented visual SLAM according to certain embodiments of the present disclosure. In certain embodiments, the method 400 as shown in FIG. 4 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 4.

In certain embodiments, before the procedures shown in FIG. 4, the method may need to initialize a 2D pixel map or a 2D grid cell map. Specifically, when the scan-matching SLAM application 118 is initialized, and there is no map available yet, the map module 142 is configured to construct a 2D map based on the first few captured frames. Basically, the RGBD sensor 150 captures a plurality of images or frames (at least two), the image processor 120 process the images to obtain RGB images and depth images, the image ground detector 122 uses the RGB images to calculate scores representing how likely the pixels are on the ground plane, the nearest neighbor normal direction detector 124 detects normal directions of the depth image pixels, the ground plane fusion module 126 determines ground plane based on extrinsic parameters of the RGBD sensor 150, the scores, the normal directions, and the correspondence between the RGB image pixels and the depth image pixels, the depth image projecting module 128 defines the ground plane as 2D grid cells and projects the depth image pixels to the grid cells of the ground plane, the color descriptor generator generates a color descriptors for the pixels in each of the grid cells, the scan and descriptor combining module 132 associate the color descriptors with the 2D grid cells, the pose update module 138 calculates robot poses in the 2D space based on the projected pixel correspondence among the several frames, and the map module 142 constructs a 2D map based on the robot poses and the correspondence among the several frames. The constructed 2D map may further include key frames (images) and poses of the mapping device corresponding to each key frame. In certain embodiments, the 2D grid cell map may not be prepared in advance. Instead, the 2D grid cell is formed when the depth image projecting module 128 defines the ground plane in the form of 2D grid cells.

At procedure 402, the RGBD sensor 150 and an IMU/wheel encoder 170 are provided. The extrinsic and optionally the intrinsic parameters of the RGBD sensor 150 are stored in the configuration file 144. The extrinsic parameters may define the orientation and location of the RGBD sensor 150 relative to the robotic device 110, and the intrinsic parameters may include optical center, distortion, and focal length of the RGBD sensor 150. The extrinsic parameter of the RGBD sensor 150 may be in the form of (x, y, z, roll, yaw, pitch) which specifies the RGBD sensor 150 position in the robot frame, that is, the parameters (x, y, z, roll, yaw, pitch) of the RGBD sensor 150 are relative to the robotic device 110. The RGBD sensor 150 captures RGBD images of the environment and the IMU/wheel encoder 170 records respectively specific force and speed/distance/position to obtain traveled distance of the robotic device 110. The RGBD images may have combined information of RGB images and depth images as different layers, or include the RGB images and the depth images separately. In this step, the RGBD sensor 150 captures a current RGBD image or frame, and the IMU/wheel encoder 170 records the distance traveled immediately after capturing the previous image to immediately after capturing the current image. The RGBD sensor 150 then sends the current RGBD image to the image processor 120. The IMU/wheel encoder 170 sends the traveled distance to the pose updating module 138.

At procedure 404, upon receiving the current RGBD image, the image processor 120 splits the current RGBD image to an RGB image and a depth image. In certain embodiments, the RGBD image may include an R layer, a G layer, a B layer, and a depth layer, and the image processor 120 extracts the R layer, the G layer and the B layer to form the RGB image, and extracts the depth layer as the depth image. In certain embodiments, the RGBD sensor 150 may capture and store the RGB image and the depth image separately and the procedure 404 isn't necessary. In this embodiment, the image processor 120 is part of the scan-matching SLAM application 118. In other embodiments, the image processor 120 may also be an integrated part of the RGBD sensor 150. After obtaining the RGB image and the depth image from the current RGBD image, the image processor 120 sends the RGB image to the image ground detector 122 and sends the depth image to the nearest neighbor normal direction detector 124.

At procedure 406, upon receiving the RGB image, the image ground detector 122 calculates scores for the pixels in the RGB image, where the scores indicate the possibility of the pixels being located in the ground plane. The image ground detector 122 may determine features for each pixel in the current RGB image, recognize those features such as edges, corners, blobs, and ridges, and determine different planes based on the recognized features. In certain embodiments, the image ground detector 122 determines the planes using a deep learning algorithm. The deep learning algorithm provides the score for each RGB image pixel. The pixels close to each other and having similar scores form a plane. The formed planes may include ground plane, wall, door, windows, etc. In certain embodiments, a DNN that performs classification, for example YOLO2 is used. Because the RGB image normally have a high resolution, the determined planes from the RGB image have accurate size and edges; in other words, the pixels in the RGB image can be accurately assigned to one of the planes or non-plane area. However, it is hard to know the exact direction the planes facing in the real world, and it is not easy to differentiate the ground plane from the other determined planes. After determining the scores of the pixel or the planes, the image ground detector 122 sends the scores or/and the determined planes to the ground plane fusion module 126.

At procedure 408, upon receiving the depth image, the nearest neighbor normal direction detector 124 detects normal direction for each pixel in the depth image. In certain embodiments, the normal direction of the pixel is determined by analyzing the neighboring pixels of the pixel. In certain embodiments, for each target pixel, the nearest neighboring normal direction detector 124 chooses eight neighboring pixels in the 2D depth image, and calculates a plane encompassing the eight neighboring pixels and the target pixel. Then the nearest neighboring normal direction detector 124 defines the normal direction of the target pixel as the straight line passing through the target pixel and perpendicular to the calculated plane.

In certain embodiments, the procedures 406 and 408 are performed in different threads so as to improve the efficiency of the performance of the scan-matching SLAM application 118.

At procedure 410, upon receiving the scores of the RGB image pixels and the normal directions of the depth image pixels, and based on the correspondence between the RGB image pixels and the depth image pixels and the extrinsic parameters of the RGBD sensor 150, the ground plane fusion module 126 determines the ground plane. In certain embodiments, the normal directions of the depth image pixels are obtained, and the ground plane fusion module 126 determines planes in the depth image by voting. Specifically, firstly, based on camera extrinsic parameter, the process obtains which 3D points may belong to the ground (the points that have the height similar to 0). Secondly, the process groups the points on the ground with similar normal together and compare the normal with the ground normal. Thirdly, the process extracts the ground points and fit a ground plane with the above ground plane model and set it as the ground. The voting may be performed by finding the number of pixels that have the same normal directions, and the large the number the higher the rank in the voting. For examples, all the pixels on a ground floor have the same normal direction, and the number of those pixels are counted; all the pixels on a wall have the same normal direction, and the number of those pixels are counted; all the pixels on a door have the same normal direction, and the number of those pixels are counted. The number of pixels may be ranked by the number of pixels on the ground floor>the number of pixels on the wall>the number of pixels on the door. By voting, the ground plane, the plane of the wall and the plane of the door are determined to be candidate planes for the ground plane. Then the ground plane fusion module 126 determines the bottom surface of the robotic device 110 based on the extrinsic parameters of the RGBD sensor and the current pose of the RGBD sensor, because the relative position of the RGBD sensor to the bottom surface of the robotic device 110 can be defined based on the extrinsic parameters. The ground plane fusion module 126 then compare the candidate planes and the bottom surface of the robotic device 110, and determines one of the candidate planes that ranked high in the voting and is close to the bottom surface of the robotic device 110 as the ground plane. A depth image normally has more noise than an RGB image. Therefore, after determining the ground plane in the depth image, the ground plane fusion module 126 compares the ground plane in the depth image with the scores of pixels in the RGB image to locate the plane position in the RGB image. Because the RGB image normally has high resolution, the ground plane fusion module 126 defines the ground plane based on the pixels in the RGB image that corresponding to the ground plane in the depth image. By this operation, the noise inherently exists in the depth image can be filtered out, and the ground plane is defined accurately. The ground plane fusion module 126 then sends the determined ground plane to the depth image projecting module 128 and the color descriptor 130. In certain embodiments. The ground plane fusion module 126 further construct a 2D gridded cell map on the ground plane. In certain embodiments, the ground plane fusion module 126 uses the extrinsic parameters of the RGBD sensor 150 to estimate the ground plane, and uses the normal directions from the depth image to refine the estimated ground plane. In certain embodiments, the ground plane fusion module 126 uses the extrinsic parameters of the RGBD sensor 150 to estimate the ground plane, uses the normal directions from the depth image to refine the estimated ground plane, and then uses the scores from the RGB image to further refine the estimated ground plane.

At procedure 412, upon receiving the determined ground plane, the depth image projecting module 128 projects the pixels in the depth image to the ground plane. The depth image is a 3D image, but the projection of the depth image pixels to the ground plane collapse the 3D information into 2D information. The projecting process is also called scan. Because the ground plane is determined accurately, the depth image projecting module 128 can project each of the depth image pixels to the same location in the ground plane, no matter whether the robotic device 110 is tilt or not. In certain embodiments, before projection, the ground plane fusion module 126 or the depth image projecting module 128 may first divide the ground plane into grid cells, and then the depth image projecting module 128 projects the pixels in the depth image to the corresponding grid cells along the perpendicular direction of the ground plane.

Further, at procedure 414, upon receiving the determined ground plane and the projected pixels in each grid cell, the color descriptor generator 130 generates a color descriptors for each of the grid cells. Specifically, each projected depth image pixel has a corresponding RGB image pixel. For all the pixels in one grid cell, the corresponding RGB information from the RGB image are combined in certain ways to form one descriptor. In other words, each of the grid cells in the 2D grid cell map, if not empty, is characterized by a color descriptor. After projecting the depth image pixels and provide color descriptors of the corresponding RGB image pixels, the scan and descriptor combining module 132 associate the color descriptors with the grid cells on the ground plane. The scan and descriptor combining module 132 then sends the grid cells with associated color descriptors obtained from the current frame to the scan and descriptor matching module 134. Now each of the grid cells in the ground plane has a form of (distance, roll angle, descriptor), which represents the location of the grid cell and its descriptor.

At procedure 416, upon receiving the grid cells (2D scan) with the associated color descriptors (hybrid grid cells) from the scan and descriptor combining module 132 and the grid cell map from the map module 142, the scan and descriptor matching module 134 matches those hybrid grid cells to the grid cell map. The map includes grid cells having the states of occupied, empty, and unknown. The state of occupied indicates a grid cell containing at least one pixel, such as a solid surface of a furniture; the state of empty indicates a grid cell doesn't containing a pixel, such as an empty space; and the state of unknown indicates a grid cell where the robotic device 110 haven't scanned yet. For each grid cell having the state of occupied, the grid cell is defined by (distance, roll angle, color descriptor), which incorporates the information of the pixels included or projected in the grid cell. The scan and descriptor matching module 134 matches the scan grid cells with color descriptors to the occupied grid cells in the map, based on the distance, the roll angle, and then verifies using the color descriptor. In certain embodiments, the scan and descriptor matching module 134 may also matches the hybrid grid cells to the hybrid grid cells in the immediately previous frame or the previous key frame. The color descriptor has a high resolution due to the high resolution RGB image, and the distribution of the pixels in each grid cell is specific. Therefore, adding of the color descriptor during matching increases the accuracy of matching. After matching the hybrid grid cells on the ground plane in the current frame to the grid cells in the grid cell map, the scan and descriptor matching module 134 sends the match result to the loop closure module 136 and the pose updating module 138.

At procedure 418, upon receiving the matched result from the scan and descriptor matching module 134 and the map from the map module 142, the loop closure module 136 detects possible loop closure based on the matching of the scan grid cells to the map; and the pose updating module 138 calculates the current pose of the robotic device 110 in the global frame, and updates the robot pose and the occupied grid cell location based on the matching result and the detected loop closure. Here the global frame means the coordinate system of the 2D map. In certain embodiments, the information from the IMU/wheel encoder 170 is also used for robot pose and grid cell location updating. When the updated pose is available, the pose updating module 138 propagates the robot pose through the pose propagation module 140, and sends the robot pose to the pose receiving module 146. The pose propagation module 140 propagates the updated robot pose to the next frame, so that the depth image projecting module 128 may use the robot pose in the current frame to estimate the robot pose in the next frame. The pose receiving module 146 may operate its function based on the updated robot pose.

Further, the pose updating module 138 sends the updated robot pose and the matched grid cells to the map module 142, such that at procedure 420, the map module 142 update the 2D scan map with color descriptors. Specifically, the updated robot pose and the updated occupied grid cell location are now recorded in the map, and the hybrid grid cells that are not matched are added in the map. In the embodiment, the map is in a form of grid cell map. In certain embodiments, the map may also be other type of occupation map or a pixel map.

In a further aspect, the present disclosure is related to a non-transitory computer readable medium storing computer executable code. The code, when executed at a processor of a computing device, may perform the method 400 as described above. In certain embodiments, the non-transitory computer readable medium may include, but not limited to, any physical or virtual storage media. In certain embodiments, the non-transitory computer readable medium may be implemented as the storage device 116 of the robotic device 110 as shown in FIG. 1.

Figure 5:
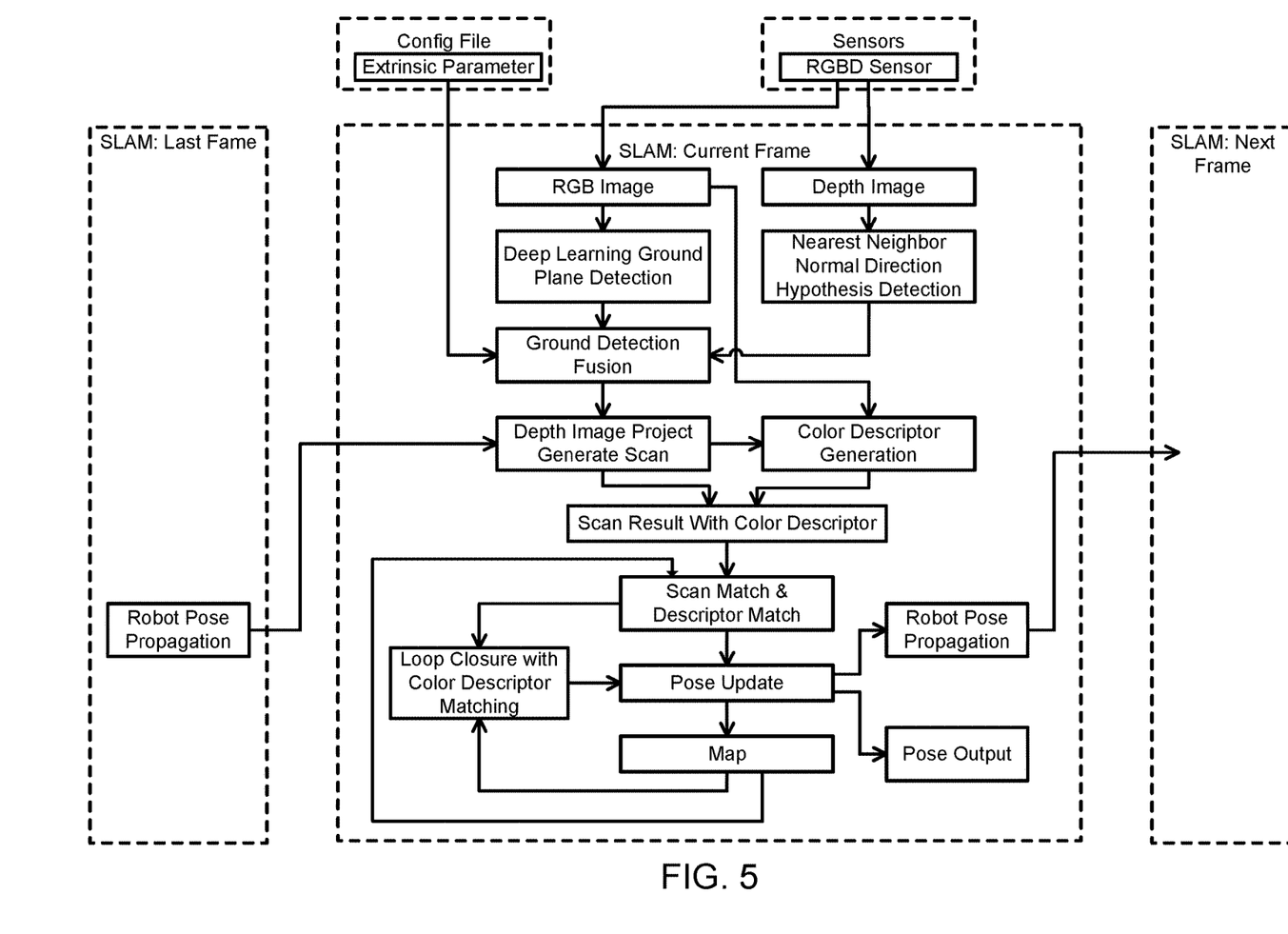
FIG. 5 schematically depicts a flowchart of scan-matching oriented visual SLAM according to certain embodiments of the present disclosure.

FIG. 5 schematically depicts an exemplary work flow of a scan-matching oriented SLAM according to certain embodiments of the present disclosure. As shown in FIG. 5, the work flow for the current frame is similar to the above method 400; the robot pose is propagated from the last frame to the current frame, and from the current frame to the next frame; and the grid cell map or pixel map is updated for every frame.

In summary, certain embodiments of the present disclosure, among other things, have the following advantages over related art.

Firstly, the ground plane of the environment is determined based on normal directions of the depth image pixels, the color descriptors of the RGB image pixels, and the extrinsic parameters of the RGBD sensor. The correctness and accuracy of the determined ground plane are assured.

Secondly, the 3D information of the depth image pixels is projected to the 2D grid cell map or pixel map, and further operation based on the map such as matching pixels to the map is more efficient.

Thirdly, the color information is associated with the depth image information, and the accuracy of match between the pixels and the map is further improved.

Fourthly, the image ground detector, the nearest neighbor normal direction detector and the loop closure module are performed using different threads, which improves the efficiency of the operation of the application.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for generating and updating a 2D grid cell map, comprising:
    providing a red-green-blue (RGB) image and a depth image of a three-dimensional (3D) space by a sensor of a computing device, the sensor having extrinsic parameters;
    determining scores of pixels in the RGB image, wherein the scores representing possibility of the pixels in the RGB image being located in a ground plane;
    determining normal directions of pixels in the depth image;
    determining the ground plane based on the extrinsic parameters, the scores and the normal directions;
    projecting the pixels in the depth images to the ground plane to form projected pixels;
    when the 2D grid cell map is not available, generating the 2D grid cell map by defining the ground plane into grid cells and attributing a color descriptor to each grid cell, wherein the color descriptor of each grid cell is calculated based on the projected pixels within that grid cell; and
    when the 2D grid cell map is available, updating the 2D grid cell map by attributing a new color descriptor to each grid cell and updating that grid cell based on the new color descriptor.

2. The method of claim 1, wherein the sensor is an RGB-depth (RGBD) sensor and the computing device is a robotic device.

3. The method of claim 1, wherein the scores of the pixels in the RGB image are determined using deep learning.

4. The method of claim 1, wherein the normal directions of the pixels in the depth image are determined using nearest neighbor normal direction.

5. The method of claim 1, wherein the step of determining the ground plane comprises:
    defining a candidate ground plane based on the extrinsic parameters; and
    refining the candidate ground plane based on the normal directions of the pixels in the depth images to obtain the ground plane.

6. The method of claim 1, wherein the step of determining the ground plane comprises:
    defining a candidate ground plane based on the extrinsic parameters;
    refining the candidate ground plane based on the scores of the pixels in the RGB image and the normal directions of the pixels in the depth images to obtain the ground plane.

7. The method of claim 1, wherein each of the pixels in the depth image is projected to the ground plane along a straight line passing through the pixel and perpendicular to the ground plane.

8. The method of claim 1, wherein the ground plane comprise a true ground plane in the 3D space and a plane parallel to the true ground plane and located within a pre-determined distance to the true ground plane.

9. The method of claim 1, wherein the color descriptor comprises at least one of color histogram, color gradient, and binary descriptor.

10. The method of claim 1, further comprising: initializing the 2D grid cell map using a plurality of RGB images and corresponding depth images.

11. A method, comprising:
    providing a red-green-blue (RGB) image and a depth image of a three-dimensional (3D) space by a sensor of a computing device, the sensor having extrinsic parameters;
    determining normal directions of pixels in the depth image;
    determining a candidate ground plane based on the extrinsic parameters;
    refining the candidate ground plane using the normal directions to obtain the ground plane;
    projecting the pixels in the depth images to the ground plane to form projected pixels; and
    generating a 2D grid cell map by defining the ground plane into grid cells and attributing a color descriptor to each grid cell, wherein the color descriptor of each grid cell is calculated based on the projected pixels within that grid cell.

12. The method of claim 11, further comprising, when the 2D grid cell map is available: updating the 2D grid cell map by attributing a new color descriptor to each grid cell and updating the corresponding grid cell in the 2D grid map based on the new color descriptor, wherein the new color descriptor of each grid cell is calculated based on the projected pixels within that grid cell.

13. The method of claim 11, further comprising, after determining the candidate ground plane and before refining the candidate ground plane: refining the candidate ground plane using scores of pixels in the RGB image, wherein the scores representing possibility of the pixels in the RGB image being located in a ground plane.

14. A non-transitory computer readable medium storing computer executable code, wherein the computer executable code, when executed at a processor of a computing device, is configured to perform the method of claim 11.

15. A system comprising a computing device, the computing device having a sensor, a processor and a storage device storing computer executable code, wherein the computer executable code, when executed at the processor, is configured to perform the method of claim 11.

16. A system for generating and updating a 2D grid cell map, comprising a computing device having a sensor, a processor and a storage device storing computer executable code, the computer executable code, when executed at the processor, is configured to:
provide a Red-green-blue (RGB) image and a depth image of a three-dimensional (3D) space by the sensor;
determine scores of pixels in the RGB image, wherein the scores representing possibility of the pixels in the RGB image being located in a ground plane;
determine normal directions of pixels in the depth image;
determine the ground plane based on the extrinsic parameters, the scores and the normal directions;
project the pixels in the depth images to the ground plane to form projected pixels;
when the 2D grid cell map is not available, generate the 2D grid cell map by defining the ground plane into grid cells and attributing a color descriptor to each grid cell, wherein the color descriptor of each grid cell is calculated based on the projected pixels within that grid cell; and
when the 2D grid cell map is available, updating the 2D grid cell by attributing a new color descriptor to each grid cell and updating that grid cell based on the new color.

17. The system of claim 16, wherein the sensor is an RGBD sensor.

18. The system of claim 16, wherein the scores of the pixels in the RGB image are determined using deep learning.

19. The system of claim 16, wherein the normal directions of the pixels in the depth image are determined using nearest neighbor normal direction.

20. The system of claim 16, wherein the computer executable code is configured to determine the ground plane by:
defining a candidate ground plane based on the extrinsic parameters; and
refining the candidate ground plane based on the normal directions to obtain the ground plane.

* * * * *